US009191802B2

(12) United States Patent
Lee

(10) Patent No.: US 9,191,802 B2
(45) Date of Patent: Nov. 17, 2015

(54) METHOD AND APPARATUS FOR MANAGING SUBSCRIBER INFORMATION IN MOBILE COMMUNICATION SYSTEM INCLUDING FEMTOCELL

(75) Inventor: Song Hak Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 50 days.

(21) Appl. No.: 13/582,276

(22) PCT Filed: Feb. 23, 2011

(86) PCT No.: PCT/KR2011/001171

§ 371 (c)(1), (2), (4) Date: Aug. 31, 2012

(87) PCT Pub. No.: WO2011/108819

PCT Pub. Date: Sep. 9, 2011

(65) Prior Publication Data

US 2012/0329478 A1 Dec. 27, 2012

(30) Foreign Application Priority Data

Mar. 2, 2010 (KR) ........................ 10-2010-0018411

(51) Int. Cl.

*H04W 8/04* (2009.01)
*H04W 60/00* (2009.01)
*H04W 84/04* (2009.01)

(52) U.S. Cl.

CPC ................ *H04W 8/04* (2013.01); *H04W 60/00* (2013.01); *H04W 84/045* (2013.01)

(58) Field of Classification Search

CPC ...... H04W 8/04; H04W 60/00; H04W 84/045
USPC ........... 455/435.1, 436, 561, 556.1, 466, 446, 455/456.2, 432.1–444, 410–411, 455/456.1–457; 370/338, 328, 331

See application file for complete search history.

(56) References Cited

U.S. PATENT DOCUMENTS

| | | | | |
|---|---|---|---|---|
| 8,265,033 B2 * | 9/2012 | Gunnarsson et al. | ......... | 370/331 |
| 8,626,162 B2 * | 1/2014 | Deshpande et al. | ....... | 455/435.1 |
| 2009/0047968 A1 | 2/2009 | Gunnarsson et al. | | |
| 2009/0054082 A1 * | 2/2009 | Kim et al. | .................. | 455/456.2 |
| 2009/0156208 A1 | 6/2009 | Vesterinen et al. | | |
| 2009/0181672 A1 * | 7/2009 | Horn et al. | ................ | 455/435.1 |

(Continued)

FOREIGN PATENT DOCUMENTS

KR 10-2009-0126282 A 12/2009

*Primary Examiner* — Sharad Rampuria

(74) *Attorney, Agent, or Firm* — Jefferson IP Law, LLP

(57) ABSTRACT

The present invention relates to a method and apparatus for managing subscriber information and includes transmitting a tracking area update request message generated for subscriber information handling from a terminal to a mobility management entity; transmitting an update location request message generated for the subscriber information handling from the mobility management entity to a home subscriber server; and handling, at the home subscriber server, the subscriber information according to whether the update location request message includes subscriber information handling configuration and responding according to whether the subscriber information is processed successfully. According to the present invention, the subscriber is capable of handling, i.e. creating or deleting, the Closed Subscriber Group identifier (CSG ID) at each node of the system by means of the UE.

21 Claims, 10 Drawing Sheets

910
Transceiver
930
Controller
Tau Message Handler
930A
Update Location Message Handler
930B
NAS Message Handler
930C
920
Controller
Subscriber Profile Storage Region
920A

(56) References Cited

U.S. PATENT DOCUMENTS

2009/0305671 A1* 12/2009 Luft et al. .................... 455/411
2010/0075708 A1* 3/2010 Hong et al. .................. 455/518
2010/0159899 A1* 6/2010 Horn et al. ................ 455/414.1
2010/0202351 A1* 8/2010 Xi et al. ....................... 370/328
2011/0022686 A1* 1/2011 Ding ............................ 709/219
2011/0223887 A1* 9/2011 Rune et al. .................... 455/411
2012/0099578 A1* 4/2012 Aramoto et al. .............. 370/338
2014/0342735 A1* 11/2014 Liao .......................... 455/435.1

* cited by examiner

FIG . 4

| 8 7 6 5 | 4 | 3 2 1 | |
|---|---|---|---|
| EPS update type IEI | 0 Spare | EPS update type Value | octet 1 |

METHOD AND APPARATUS FOR MANAGING SUBSCRIBER INFORMATION IN MOBILE COMMUNICATION SYSTEM INCLUDING FEMTOCELL

FIELD OF THE INVENTION

The present invention relates to a method and apparatus for managing subscriber information, especially, Closed Subscriber Group (CSG) ID in a mobile communication system including femto cells. In more particular, the present invention relates to a method and apparatus for managing CSG ID information to allow the subscriber to register new CSG ID information with the system, delete the registered CSG ID information, or modify the registered CSG ID information by means of a user terminal.

DESCRIPTION OF THE RELATED ART

Femto cell is a small mobile communication base station connected to the mobile communication core network through a broadband network installed in an indoor environment. The femto cell is advantageous to expand the indoor coverage, improve communication quality, and facilitate providing various wired-wireless convergence services.

In the 3GPP Long Term Evolution (LTS) standard, evolved Node B (eNB) and home eNB are defined as base stations. The eNB is a macro base station responsible for managing the normal macro cell, and the home eNB is the femto base station responsible for managing a femto cell.

That is, the 3GPP is in consideration of the environment where the femto cells allowing for specific users' access are deployed in separation of the legacy macro eNB. At this time, the femto cell can be installed by a user or a service provider for the purpose of coverage expansion, capacity improvement, or specialized service provision. The service coverage of the femto cell can be designed to have from a few meters up to the extent of macro cell coverage.

The subscriber information used in the mobile communication system including femto cells, particularly Closed Subscriber Group ID (CSG ID), is the information on a specific subscriber or user group for a femto cell service. The CSG ID is managed by most network nodes such as Home Subscriber Server (HSS) as well as UE, femto cell eNB, and Mobility Management Entity (MME) of the core network.

However, the conventional CSG ID handling method is performed by individual network nodes and thus it takes complicated operations and time to synchronize the informations stored in the respective network nodes. Also, the conventional CSG ID handling method is complicated in view of the user so as to obstruct widespread use of femto cell service.

There is therefore a need of a method in order for a subscriber to create, delete, and modify CSG ID information of individual network nodes efficiently.

The Object of the Present Invention

The present invention has been made in an effort to solve the above problem and it is an object of the present invention to provide a management method and apparatus that is capable of allowing the subscriber to create, delete, or modify the CSG ID information at individual network node with simple UE manipulation action.

The Technical Solution of the Present Invention

In order to solve the above problem, a method of handling subscriber information in a mobile communication system including femto cells includes transmitting a tracking area update request message generated for subscriber information handling from a terminal to a mobility management entity; transmitting an update location request message generated for the subscriber information handling from the mobility management entity to a home subscriber server; and handling, at the home subscriber server, the subscriber information according to whether the update location request message includes subscriber information handling configuration and responding according to whether the subscriber information is processed successfully, wherein the subscriber information is a Closed Subscriber Group identifier (CSG ID).

A terminal for handling subscriber information in a mobile communication system including femto cells includes a subscriber information handler unit which checks subscriber inflation management necessity and generates a control signal for handling the subscriber information; a tracking area update message generator which generates, when the control signal is received, a tracking area update request message for handling the subscriber information; and a radio communication unit which transmits the tracking area update message.

A mobility management entity for managing subscriber information in a mobile communication system including femto cells includes a storage unit which stores the subscriber information; a tracking area update message handler which receives a tracking area update request message transmitted by a terminal, determines whether subscriber information management configuration is included, and generates, when the subscriber information management configuration is included, a control signal for handling the subscriber information; an update location message handler which generates, when the control signal is received, an update location request message for handling the subscriber information; and a radio communication unit which transmitting/receiving messages for handling the subscriber information.

A home subscriber server for handling subscriber information in a mobile communication system including femto cells includes a storage unit which stores the subscriber information; a subscriber information handler which determines whether a received update location request message includes a subscriber information handling configuration and handles, when the subscriber information handling configuration is included, the subscriber information; an update location message handler which generates a response message according to whether the subscriber information is handled successfully; and a radio communication unit which transmits/receives the messages for handling the subscriber information.

The Effect of the Present Invention

According to the present invention, the subscriber is capable of managing, i.e. creating and deleting, CSG ID information at each node of the system by means of the UE. The network operator is capable of providing CSG ID information management function through related application function update at the conventional network node without introduction of extra network node such as CSG list management server for CSG ID handling function. Since the user manages the CSG ID information directly by means of the UE, it is possible to solve the inconsistency problem of CSG ID information managed at different network nodes.

BRIEF DESCRIPTION OF THE DRAWINGS

FIG. 4 is a diagram illustrating the Information Element for EPS update result in the conventional tracking area update accept message.

DETAILED DESCRIPTION OF EXEMPLARY EMBODIMENTS

Although the subject matter of the present invention is directed to the Long Term Evolution (LTE) system, the present invention is not thereto but applicable to other mobile communication systems such as Wideband Code Division Multiple Access (WCDMA) system.

Although the description is directed to the subscriber information management in the mobile communication system including femto cells, particularly the CSG ID management method, the subscriber information is not limited to CSG ID but other identifiers that can be used for identifying subscriber or subscriber group.

Exemplary embodiments of the present invention are described with reference to the accompanying drawings in detail. The same reference numbers are used throughout the drawings to refer to the same or like parts. Detailed description of well-known functions and structures incorporated herein may be omitted to avoid obscuring the subject matter of the present invention.

Figure 1:
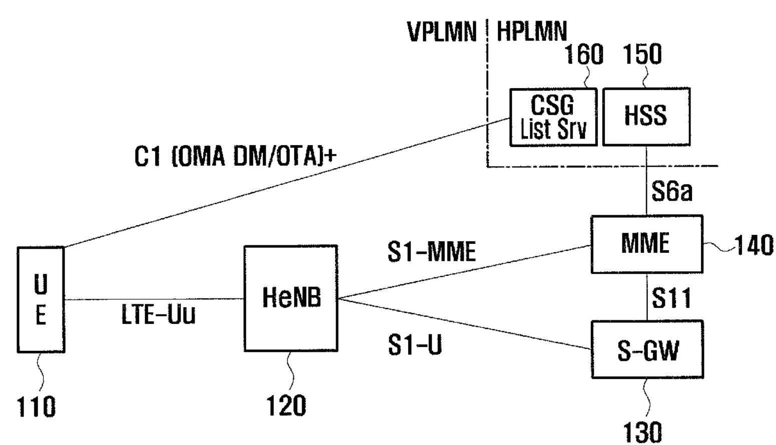
FIG. 1 is a diagram illustrating network architecture for conventional CSG ID list management.

FIG. 1 is a diagram illustrating network architecture for conventional CSG ID list management.

As aforementioned, the CSG ID is the information for identifying a specific subscriber of a user group to provide the femto cell service. The mobility Management (MME), Serving GPRS Support Node (SGSN), Home Subscriber Server (HSS), and Home Location Register (HLR) of the Core Network manage the CSG IDs in the form of list which is referred to as CSG ID list.

The UE 110 connects to the core network via the macro eNB (not shown) or the femto cell eNB 120.

The femto cell eNB (HeNB) 120 is connected to the core network via the radio network controller (not shown) and the MME 140 to provide the UE 110 with mobile communication service. Here, the femto cell is also referred to as Closed Subscriber Group (CSG) cell which allows for the access of only the UEs registered with a specific group (i.e. CSG). Typically, the CSG cell can be a home cell deployed at a small area such as home or company/local network cell deployed at a relatively large area such as a company building or organization building. The home cell or femto cell eNB 120 installed at an area provides the registered UE 110 with the mobile communication service and broadcast System Information Block (SIB) including the identity information of a specific group to which it belongs to provide the service, i.e. CSG ID.

The Serving Gateway 130 acts as a mobility anchor in handover between eNBs or roaming across 3GPP radio networks. The serving gateway 130 processes the bearer signal generated by the UE 110.

The Mobility Management Entity (MME) 140 manages the UEs in idle mode and selects Packet Data Network (PDN) Gateway and Serving Gateway. The MME is also responsible for the functions related to the roaming and authentication.

The Home Subscriber Server (HSS) 150 is responsible for subscriber service profile management function to support call (session) processing function. The HSS 150 stores the subscriber identity information, authentication and authorization-related network access control information for subscriber protection, subscriber registration location information, subscriber profile information, etc.

The CSG list server 160 is generates the CSG IDs in the form of a list and manages the operation for creating or deleting CSG ID.

The conventional CSG ID information management method of the UE 110 is performed between the UE 110 and the CSG list server 160 using a protocol such as Open Mobile Alliance Device Management (OMA DM). In this case, the CSG ID information management method of the femto cell eNB 120 is provided through a management interface such as TR-069 protocol.

However, the protocols such as OMA DM and TR-069 are not the dedicated protocols designed for use in CSG ID information management but normal protocols for the purpose of device management. Currently, the 3$^{rd}$ Generation Partnership Project (3GPP) takes the use of the protocols such as OMA DM and TR-069 into no consideration.

Meanwhile, in the CSG ID management method of the core network, each node stores the CSG subscription information provided from the HSS or HLR in the subscriber location registration process. Afterward, the corresponding node performs subscription check function to the CSG ID received from the femto cell eNB 120 upon receipt of the service request of the UE 110.

As aforementioned, the conventional CSG ID management method is performed by each network node individually. Accordingly, it takes many operations and long time to synchronize the CSG ID informations stored in the respective nodes. Also, in view of the subscriber or user, the complicated CSG ID information management method obstructs widespread use of the femto cell service.

Therefore, the present invention proposes a management method enabling the subscriber to create or delete CSG ID information of each network node through simplified manipulation by means of the UE 110.

In order to accomplish this, the present invention proposes a CSG ID information management method using the Tracking Area Update procedure as a basic operation for the LTE system. The present invention introduces new information for managing CSG ID information without modification of the conventional Tracking Area Update procedure.

Figure 2:
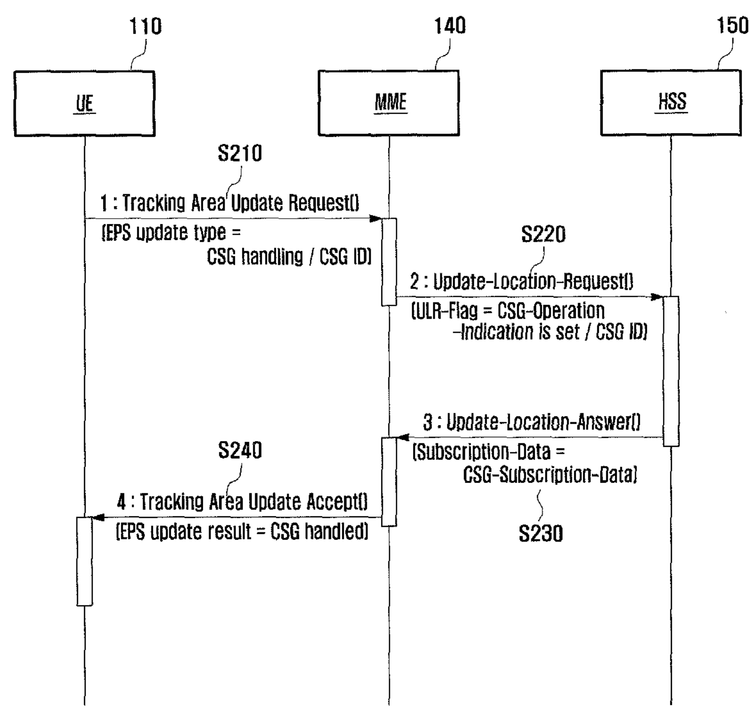
FIG. 2 is a signaling diagram illustrating the CSG ID information management procedure using the Tracking Area Update process according to an embodiment of the present invention.

FIG. 2 is a signaling diagram illustrating the CSG ID information management procedure using the Tracking Area Update process according to an embodiment of the present invention. Particularly, FIG. 2 shows the case where the CSG ID information is managed successfully.

As shown in FIG. 2, there is no need of adding a new node to the conventional network to implement the present invention. However, for the purpose of the CSG ID information management, there is a need of newly defining the formats of Tracking Area Update Request message, Tracking Area Update Accept message, Update Location Request message, and Update Location Answer message. The newly defined formats are described in detail along with the procedure depicted in FIG. 2.

If it is intended to create CSG ID information or delete the CSG ID information, the UE generates the Tracking Area Update Request message to the MME 140 at step 210.

In this case, the UE 110 further configures a CSG ID management field (or "subscriber management field") and a CSG ID information input field (or "subscriber information input field") in the conventional Tracking Area Update Request message. The CSG ID management field is configured to use the Tracking Area Update Request message for the purpose of CSG ID information management. The CSG ID information input field is configured to input the CSG ID information to be added or deleted by the subscriber or user.

Figure 3:
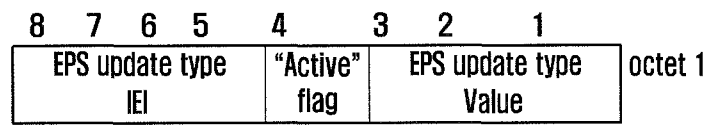
FIG. 3 is a diagram illustrating a CSG ID handling field generated newly in the conventional tracking area update request message.

For this case, an exemplary format of the CSG ID management field which is newly added to the conventional Tracking Area Update Request message is shown in FIG. 3. In FIG. 3, "EPS update type Value" which is set to "100" for indicating unused state can be newly defined to indicate CSG ID handling as shown in table 1.

TABLE 1

| EPS update type value (octet 1, bit 1 to 3) | | | |
|---|---|---|---|
| Bits | | | |
| 3 | 2 | 1 | |
| 0 | 0 | 0 | TA updating |
| 0 | 0 | 1 | combined TA/LA updating |
| 0 | 1 | 0 | combined TA/LA updating with IMSI attach |
| 0 | 1 | 1 | periodic updating |
| 1 | 0 | 0 | CSG ID handling |
| 1 | 0 | 1 | unused; shall be interpreted as "TA updating", if received by the network. |

All other values are reserved.

If the CSG ID management field is set to "CSG ID handling," the UE 110 creates the CSG ID information input field to input the CSG ID information to be managed.

For reference, the CSG ID information is in Type/Value format. In this case, Type uses a certain configuration value not overlapped with other configuration values in use, and Value is 4-byte long.

Here, the Information Element ID included in the Tracking Area Update Request message is detailed as follows in table 2.

TABLE 2

| IEI | Information Element | Presence | Format | Length |
|---|---|---|---|---|
| | Protocol discriminator | M | V | ½ |
| | Security header type | M | V | ½ |
| | Tracking area update request message identity | M | V | 1 |
| | EPS update type | M | V | ½ |
| | NAS key set identifier | M | V | ½ |
| | Old GUTI | M | LV | 12 |
| B- | NAS key set identifier | O | TV | 1 |
| 18 | Old P-TMSI signature | O | TV | 4 |

TABLE 2-continued

| IEI | Information Element | Presence | Format | Length |
|---|---|---|---|---|
| 50 | Additional GUTI | O | TLV | 13 |
| 55 | Nonce | O | TV | 5 |
| 58 | UE network capability | O | TLV | 4-15 |
| 52 | Last visited registered TAI | O | TV | 6 |
| 5C | DRX parameter | O | TV | 3 |
| A- | UE radio capability information update needed | O | TV | 1 |
| 57 | EPS bearer context status | O | TLV | 4 |
| 31 | MS network capability | O | TLV | 4-10 |
| 13 | Old location area identification | O | TV | 6 |
| 9- | TMSI status | O | TV | 1 |
| 11 | Mobile station classmark 2 | O | TLV | 5 |
| 20 | Mobile station classmark 3 | O | TLV | 2-34 |
| 40 | Supported Codecs | O | TLV | 5-n |
| TBD | CSG ID | O | TV | 5 |

In summary, when generating the Tracking Area Update Request message, the UE 110 sets "EPS update type Value" of the Tracking Area Update Request message to "CSG handling" and adds the CSG ID information to be generated or deleted in the CSG ID information input field.

If the MME 140 checks the Tracking Area Update Request message to determine that the CSG ID management field is set to CSG ID handling. Next, the MME 140 generates the Update Location Request message and transmits the Update Location Request message to the HSS 150 managing the corresponding subscriber information at step S220. In this case, the MME 140 is capable of further configuring a CSG Subscription Data AVP (or "subscriber data field") and a CSG operation indication bit (or "subscriber information management operation indication bit") in the conventional Update Location Request message. The CSG subscriber data field is optional information which is included when the CSG operation indication field is set to CSG operation indication but not included when the CSG operation indication field is not set to CSG operation indication.

The CSG subscription data field is the field for carrying the CSG ID information to be added or deleted by the subscriber or the user. The CSG subscription data field is the field defined in the standard already and consists of CSG ID as mandatory information and Expiration Date as optional information. The Update Location Request message to which the CSG subscription data field is added as shown in table 3.

TABLE 3

| Information element name | Mapping to Diameter AVP | Cat. |
|---|---|---|
| IMSI | User-Name | M |
| Supported Features | Supported-Features | O |
| Terminal Information | Terminal-Information | O |
| ULR Flags | ULR-Flags | M |
| Visited PLMN Id | Visited-PLMN-Id | M |
| RAT Type | RAT-Type | M |
| SGSN number | SGSN-Number | C |
| CSG Subscription Data | CSG-Subscription-Data | C |

Also, the CSG operation indication bit can be added to the Update Location Request message as a method for newly generating the bit value for managing the CSG UD information management in the Update Location Request message flag AVP as shown in table 4. If the CSG operation indication bit is not set, the corresponding information is ignored.

TABLE 4

| Bit | Name |
|---|---|
| 0 | Single-Registration-Indication |
| 1 | S6a/S6d-Indicator |
| 2 | Skip Subscriber Data |
| 3 | GPRS-Subscription-Data-Indicator |
| 4 | Node-Type-Indicator |
| 5 | CSG-Operation-Indication |

In summary, if the Tracking Area Update Request message of which EPS update type Value is set to "CSG handling" is received, the MME 140 sets the CSG operation indication bit of the Update Location Request message to CSG operation indication. At the same time, the MME 140 transmits the Update Location Request message including the CSG ID information to the HSS 150 of the UE 110.

The HSS 150 attempts processing the subscriber information according to whether the Update Location Request message received from the MME 140 is configured with the subscriber information management. In more detail, if the Update Location Request message includes the CSG operation indication bit value, the HSS 150 checks the CSG ID information included in the Update Location Request message. If the checked CSG ID information is not included in the CSG subscription data information of the corresponding subscriber, the HSS 150 includes the received CSG ID information in the CSG subscription data information. Otherwise, if included, the HSS 150 deletes the corresponding CSG ID information from the CSG subscription data information.

The HSS 150 generates and transmits the Update Location Success Response message to the MME 140. The Update Location response message includes the updated CSG subscription data information.

The MME extracts the CSG subscription data information from the received Updated Location Response message and updates the previously stored information. Next, the MME 140 generates and transmits the Tracking Area Update Accept message to the UE 110 at step 240. In this case, the Tracking Area Update Accept message includes the information indicating the CSG ID information management is handled successfully.

Figure 4:
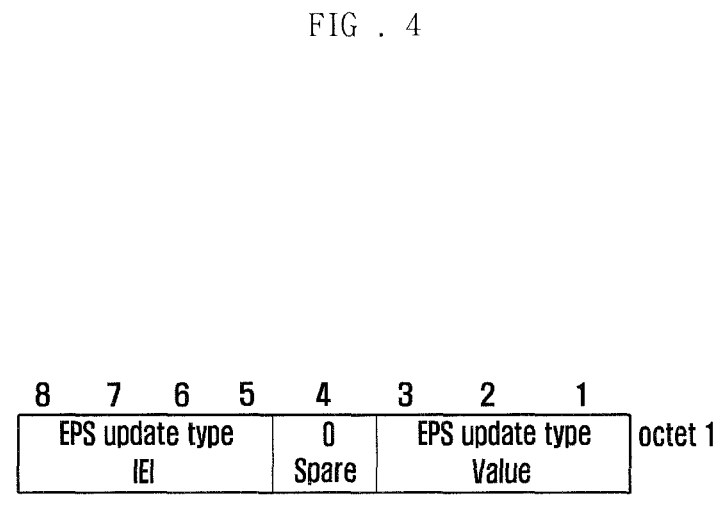

The EPS update result Information Element of the conventional Tracking Area Update Accept message is formatted as shown in FIG. 4. In order to process the response in reply to the CSG ID information management request, the value "110" of the "EPS update result value" is newly defined to indicate CSG ID handled as shown in table 5.

TALE 5

| EPS update result value (octet 1, bit 1 to 3) | | | |
|---|---|---|---|
| Bits | | | |
| 3 | 2 | 1 | |
| 0 | 0 | 0 | TA updated |
| 0 | 0 | 1 | combined TA/LA updated |
| 1 | 0 | 0 | TA updated and ISR activated (NOTE) |
| 1 | 0 | 1 | combined TA/LA updated and ISR activated (NOTE) |
| 1 | 1 | 0 | CSG ID handled |

All other values are reserved.

As shown in FIG. 2, according to the present invention, it is possible for the UE to manage the CSG ID information directly by modifying the message formation used in the conventional tracking area update procedure.

Figure 5:
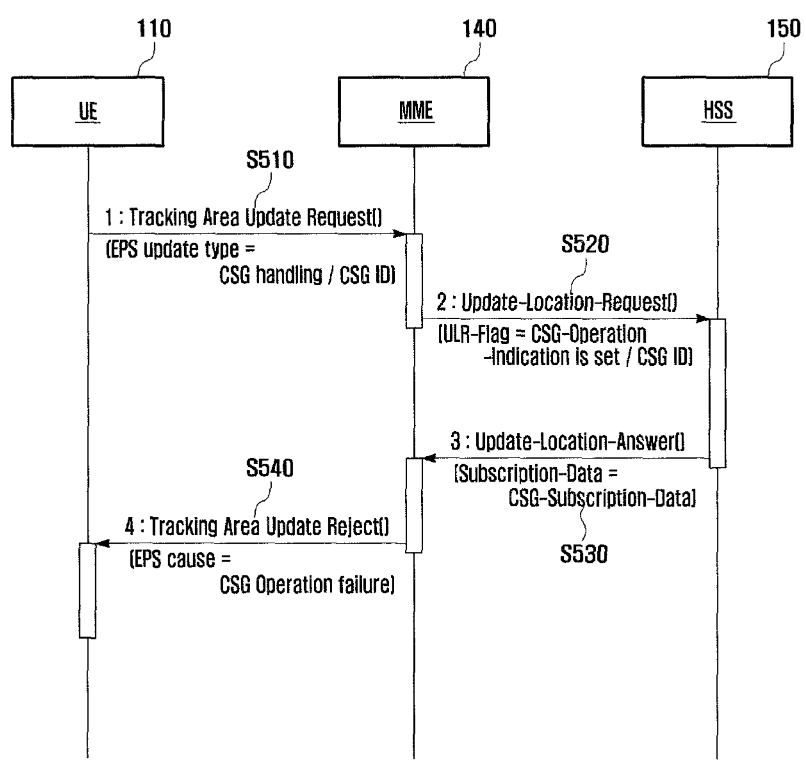
FIG. 5 is a signaling diagram illustrating CSG ID information management procedure using the tracking area update process according to an embodiment of the present invention.

FIG. 5 is a signaling diagram illustrating CSG ID information management procedure using the tracking area update process according to an embodiment of the present invention. In description with reference to FIG. 5, the features which have been already described with reference to FIG. 2 are omitted.

If it is intended to generate CSG ID information or delete the CSG ID, the UE generates and transmits the Tracking Area Update Request message to the MME 140 at step S510. In this case, the UE 110 sets the "EPS update type" of the Tracking Area Update Request message to "CSG handling" and includes the CSG ID information to be created or deleted in the message.

The MME 140 determines whether the Tracking Area Update Request message received from the UE 110 includes the CSG ID management configuration at step S520. Next, the MME 140 generates and transmits the Update Location Request message to the HSS 150 managing the corresponding subscriber information. In this case, the MME 140 configures the CSG operation indication bit value in the Update Location Request message and includes the CSG ID information received from the UE 110 in the Update Location Request message.

If it is impossible to process the CSG ID information received from the MME 140, the HSS 150 generates and transmits the Update Location Failure Response message to the MME 140. In this case, the HSS 150 includes the Experimental Result information in the Update Location Failure Response message to notify of the reason of CSG ID management failure. In order to accomplish this, "Diameter Error CSG Handling Failure" value is newly defined for the conventional Experimental Result value in order to notify the CSG ID management failure in the present invention. For reference, the experimental result values defined in the conventional standard specification include the values defined in table 6. Refer to 3GPP TS29.272 for details on the experimental result values.

TABLE 6

| |
|---|
| - DIAMETER_ERROR_USER_UNKNOWN (5001) - DIAMETER_ERROR_UNKNOWN_EPS_SUBSCRIPTION (5420) - DIAMETER_ERROR_RAT_NOT_ALLOWED (5421) - DIAMETER_ERROR_ROAMING_NOT_ALLOWED (5004) - DIAMETER_ERROR_EQUIPMENT_UNKNOWN(5422) |

If the Update Location Failure response message is received, the MME 140 generates and transmits the Tracking Area Update Reject message to the UE 110. This message includes an EMM Cause IE to indicate the cause of the failure of which Cause value is set to '00011100' to indicate the CSG ID information management failure, i.e. CSG Operation Failure (or CSG management failure) as shown in table 7.

TABLE 7

| Cause value (octet 2) | | | | | | | | |
|---|---|---|---|---|---|---|---|---|
| Bits | | | | | | | | |
| 8 | 7 | 6 | 5 | 4 | 3 | 2 | 1 | |
| 0 | 0 | 0 | 0 | 0 | 0 | 1 | 0 | IMSI unknown in HSS |
| 0 | 0 | 0 | 0 | 0 | 0 | 1 | 1 | Illegal UE |
| 0 | 0 | 0 | 0 | 0 | 1 | 1 | 0 | Illegal ME |
| 0 | 0 | 0 | 0 | 0 | 1 | 1 | 1 | EPS services not allowed |
| 0 | 0 | 0 | 0 | 1 | 0 | 0 | 0 | EPS services and non-EPS services not allowed |

TABLE 7-continued

| Cause value (octet 2) | | | | | | | | |
|---|---|---|---|---|---|---|---|---|
| Bits | | | | | | | | |
| 8 | 7 | 6 | 5 | 4 | 3 | 2 | 1 | |
| 0 | 0 | 0 | 0 | 1 | 0 | 0 | 1 | UE identity cannot be derived by the network |
| 0 | 0 | 0 | 0 | 1 | 0 | 1 | 0 | Implicitly detached |
| 0 | 0 | 0 | 0 | 1 | 0 | 1 | 1 | PLMN not allowed |
| 0 | 0 | 0 | 0 | 1 | 1 | 0 | 0 | Tracking Area not allowed |
| 0 | 0 | 0 | 0 | 1 | 1 | 0 | 1 | Roaming not allowed in this tracking area |
| 0 | 0 | 0 | 0 | 1 | 1 | 1 | 0 | EPS services not allowed in this PLMN |
| 0 | 0 | 0 | 0 | 1 | 1 | 1 | 1 | No Suitable Cells In tracking area |
| 0 | 0 | 0 | 1 | 0 | 0 | 0 | 0 | MSC temporarily not reachable |
| 0 | 0 | 0 | 1 | 0 | 0 | 0 | 1 | Network failure |
| 0 | 0 | 0 | 1 | 0 | 0 | 1 | 0 | CS domain not available |
| 0 | 0 | 0 | 1 | 0 | 0 | 1 | 1 | ESM failure |
| 0 | 0 | 0 | 1 | 0 | 1 | 0 | 0 | MAC failure |
| 0 | 0 | 0 | 1 | 0 | 1 | 0 | 1 | Synch failure |
| 0 | 0 | 0 | 1 | 0 | 1 | 1 | 0 | Congestion |
| 0 | 0 | 0 | 1 | 0 | 1 | 1 | 1 | UE security capabilities mismatch |
| 0 | 0 | 0 | 1 | 1 | 0 | 0 | 0 | Security mode rejected, unspecified |
| 0 | 0 | 0 | 1 | 1 | 0 | 0 | 1 | Not authorized for this CSG |
| 0 | 0 | 0 | 1 | 1 | 0 | 1 | 0 | Non-EPS authentication unacceptable |
| 0 | 0 | 0 | 1 | 1 | 1 | 0 | 0 | CSG operation failure |
| 0 | 0 | 1 | 0 | 0 | 1 | 1 | 1 | CS domain temporarily not available |
| 0 | 0 | 1 | 0 | 1 | 0 | 0 | 0 | No EPS bearer context activated |
| 0 | 1 | 0 | 1 | 1 | 1 | 1 | 1 | Semantically incorrect message |
| 0 | 1 | 1 | 0 | 0 | 0 | 0 | 0 | Invalid mandatory information |
| 0 | 1 | 1 | 0 | 0 | 0 | 0 | 1 | Message type non-existent or not implemented |
| 0 | 1 | 1 | 0 | 0 | 0 | 1 | 0 | Message type not compatible with the protocol state |
| 0 | 1 | 1 | 0 | 0 | 0 | 1 | 1 | Information element non-existent or not implemented |
| 0 | 1 | 1 | 0 | 0 | 1 | 0 | 0 | Conditional IE error |
| 0 | 1 | 1 | 0 | 0 | 1 | 0 | 1 | Message not compatible with the protocol state |
| 0 | 1 | 1 | 0 | 1 | 1 | 1 | 1 | Protocol error, unspecified |

Any other value received by the mobile station shall be treated as 0110 1111, "Protocol error, unspecified". Any other value received by the network shall be treated as 0110 1111, "Protocol error, unspecified".

If the Tracking Area Update Reject message is received, the UE 110 retries the tracking area update operation or terminates the corresponding operation.

Figure 6:
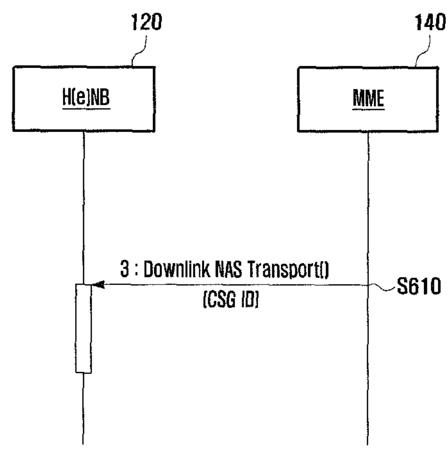
FIG. 6 is a signaling diagram illustrating a CSG ID management result notification procedure of the femto cell eNB 120 according to an embodiment of the present invention.

FIG. 6 is a signaling diagram illustrating a CSG ID management result notification procedure of the femto cell eNB 120 according to an embodiment of the present invention.

The Tracking Area Update Accept message addressed to the UE 110 is actually carried in the Downlink NAS Transport message through S1AP interference between the femto cell eNB 120 and MME 140 at step S240 of FIG. 2. Accordingly, when transmitting the Tracking Area Update Accept message for CSG ID management to the UE 110, the MME 140 includes the CSG ID information in the Downlink NAS Transport message to update the CSG ID list managed by the femto cell eNB 120 too. Table 8 shows an exemplary format of Downlink NAS Transport message including the CSG ID information.

TABLE 8

| IE/Group Name | Presence |
|---|---|
| Message type | M |
| MME UE S1AP ID | M |
| eNB UE S1AP ID | M |
| NAS-PDU | M |
| Handover Restriction List | O |
| CSG ID | O |

In table 8, "M" means Mandatory element, and "0" means Optional element.

If the Downlink NAS Transport message is received, the femto cell eNB 120 is capable of updating the CSG ID list with the CSG ID information included in the Downlink NAS Transport message. This is described in detail with reference to FIG. 6.

The MME 140 sends the femto cell eNB 120 the S1AP Downlink NAS Transport message including the Tracking Area Update Accept message at step 610. In this case, the Downlink NAS Transport message includes the CSG ID information received from the HSS 150.

The femto cell eNB 120 checks the received CSG ID information and, if the received CSG ID information does not exist in its CSG ID list, adds the CSG ID to the CSG ID list and, if the received CSG ID information exists, deletes the corresponding CSG ID information from the CSG ID list.

Figure 7:
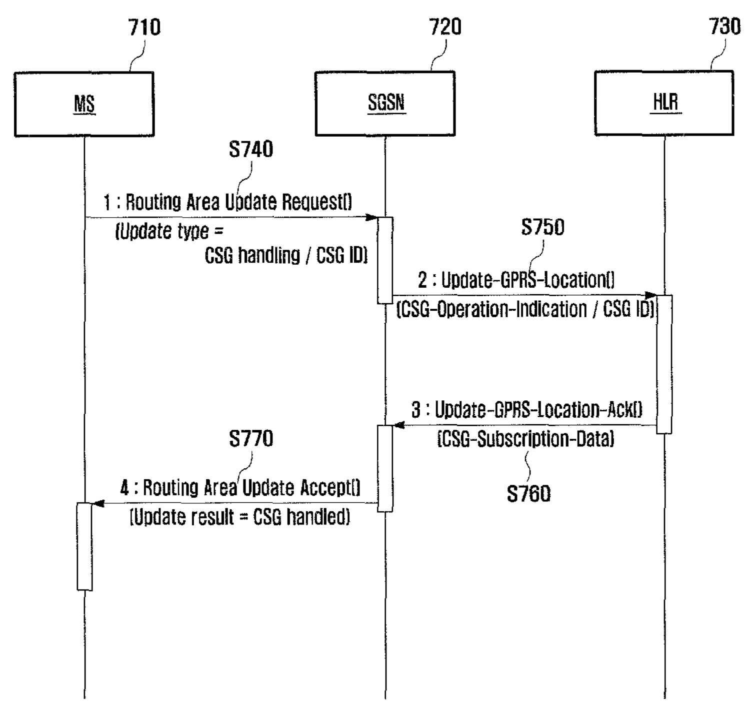
FIG. 7 is a signaling diagram illustrating the CSG ID information management procedure in a Wideband Code Division Multiple Access (WCDMA) system.

FIG. 7 is a signaling diagram illustrating the CSG ID information management procedure in a Wideband Code Division Multiple Access (WCDMA) system. Particularly, FIG. 7 shows the case where the CSG ID information is handled successfully.

The CSG ID information handling method for use in WCDMA system according to an embodiment of the present invention is similar to the CSG ID information handling method for use in LTE system as shown in FIG. 2. However, the terminologies used for expressing the respective nodes are changed (MS for UE, SGSN for MME, and HLR for HSS), and the messages for use in the Tracking Area Update procedure are changed too. Since steps S740, S750, S760, and S770 of FIG. 7 correspond to steps S210, S220, S230, and S240 of FIG. 2, detailed description thereon is omitted herein.

Figure 8:
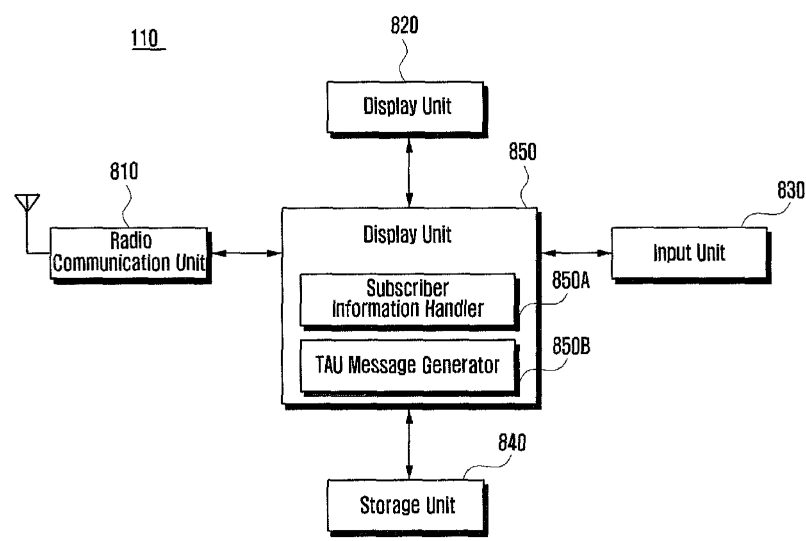
FIG. 8 is a block diagram illustrating a configuration of the UE 110 according to an embodiment of the present invention.

FIG. 8 is a block diagram illustrating a configuration of the UE 110 according to an embodiment of the present invention. As shown in FIG. 8, the UE includes a radio communication unit 810, a display unit 820, an input unit 830, a storage unit 840, and a control unit 850.

The radio communication unit 810 is responsible for radio communication function to transmit/receive data. The radio communication unit 810 is capable of including an RF transmitter for up-converting and amplifying the transmission signal and an RF receiver for low noise amplifying and down-converting the received signal. The radio communication unit 810 also delivers the control signal or data received over a radio channel to the control unit 850 and transmits the control signal or data output by the control unit 850 over the radio channel.

The display unit 820 can be implemented with Liquid Crystal Display (LCD) or Organic Light Emitted Diode (OLED). The display unit 820 presents menus, input data, function configuration information, and other information to the user. For example, the display unit 820 displays a booting screen, an idle mode screen, a display screen, a call processing screen, a setting screen, and other application execution screens.

The input unit 830 detects user's key manipulation for controlling the UE 110 and generates a key manipulation signal to the control unit 850. The input unit 830 can be implemented with a keypad including numeric and navigation keys and functions keys arranged at a side of the UE 110.

The storage unit 840 stores programs and data necessary for the operation of the UE 110 and can be divided into a program region and a data region. According to an embodiment of the present invention, the storage unit 840 is capable of storing the CSG ID information of the CSG to which the UE 110 belongs.

The control unit controls overall operations of the UE 110 according to an embodiment of the present invention. Particularly in an embodiment of the present invention, the control unit 850 is capable of including a subscriber information handler 850A and a tracking area update message generator 850B.

The subscriber information handler 850A determines whether there is the subscriber information to be handled. Particularly, the subscriber information handler 850A determines whether there is a need of creating new CSG ID information or deleting the stored CSG ID information. If it is necessary to manage the subscriber information, the subscriber information handler 850A generates a subscriber information management control signal to the tracking area update message generator 850B.

If the subscriber information management control message is received, the tracking area update message generator 850B generates a tracking area update request message. In this case, the tracking area update message generator 850B adds the CSG ID management field and CSG ID information input field to the tracking area update request message. The tracking area update message generator 850B sets the CSG ID management field to CSG ID handling and input the CSG ID information to be handled in the CSG ID information input field. The tracking area update message generator 850B controls the radio communication unit 810 to transmit the tracking area update request message.

Figure 9:
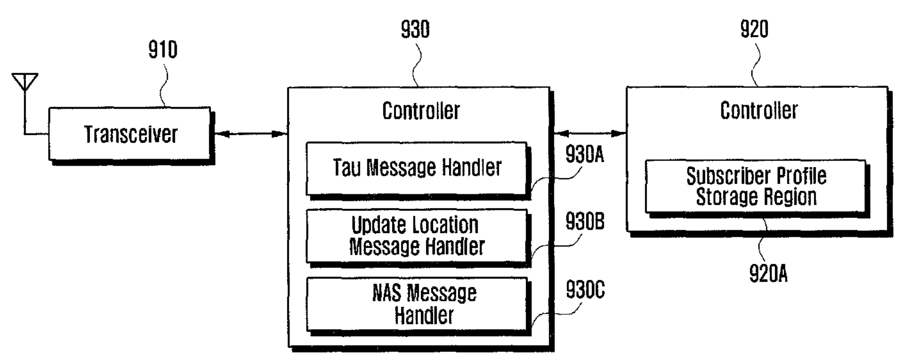
FIG. 9 is a block diagram illustrating a configuration of the MME 140 according to an embodiment of the present invention.

FIG. 9 is a block diagram illustrating a configuration of the MME 140 according to an embodiment of the present invention. As shown in FIG. 9, the MME 140 includes a transceiver 910, a storage unit 920, and a control unit 930.

The transceiver 910 is responsible for transmitting/receiving data. The transceiver 910 also receives control signal and data through wireless and wired channel and deliver the control signal and data to the control unit 930 and transmits the control signal and data output by the control unit 930 through the wireless or wired channel.

The storage unit 920 stores the programs and data necessary for the operation of the MME 140 and can be divided into a program region and a data region. According to an embodiment of the present invention, the storage unit 920 is capable of including a subscriber profile storage region 920A.

The subscriber profile storage region 920A stores the profiles of the subscribers subscribed for the mobile communication service. The subscriber profile includes a UE identifier (e.g. IMSI) for identifying the subscriber and subscription information for data service, text service, etc. Particularly, the subscriber profile includes the CSG Subscription Data containing CSG ID of the subscriber, Validation, etc.

The control unit 930 controls overall operations of the MME 140 according to an embodiment of the present invention. Particularly in an embodiment of the present invention, the control unit 930 is capable of including a tracking area update message handler 930A, an update location message handler 930B, and a NAS message handler 930C.

The tracking area update message handler 930A receives the tracking area update request message addressed to the UE 110 to check whether the CSG ID handling is configured. If the CSG ID handling is not configured, it performs the normal tracking area update procedure. Otherwise if the CSG ID handling is configured, it generates a control signal for creating an update location request message and sends this message to the update location message handler 930B.

If the CSG ID information is handled successfully, the tracking area update message handler 930A generates and transmits a Tracking Area Update Accept message to the UE 110. In this case, the Tracking Area Update Accept message includes the information on the successful CSG ID Information handling result.

Otherwise, if the CSG ID handling is failed, the tracking is update message handler 930A generates and transmits the Tracking Area Update Reject message to the UE 110.

The update location message handler 930B receives the control signal for generating the update location request message from the tracking area update message handler 930A. The update location message manager 930B generates and transmits the update location request message including CSG Subscription Data AVP and CSG operation indication bit to the HSS 150 by means of the transceiver 910.

If the CSG ID information is handled successfully, the update location message handler 930B extracts the CSG subscription data information from the update location response message transmitted by the HSS 150. The update location message handler 930B updates the CSG ID information stored in the subscriber profile storage region 920A with the extracted CSG subscription data information.

When transmitting the tracking area update accept message to the UE 110, the NAS message handler 930C includes the CSG ID information in the downlink NAS Transport message sent to the femto cell eNB 120. The femto cell eNB 120 is capable of update its CSG ID list with the updated CSG ID information included in the downlink NAS Transport message.

Figure 10:
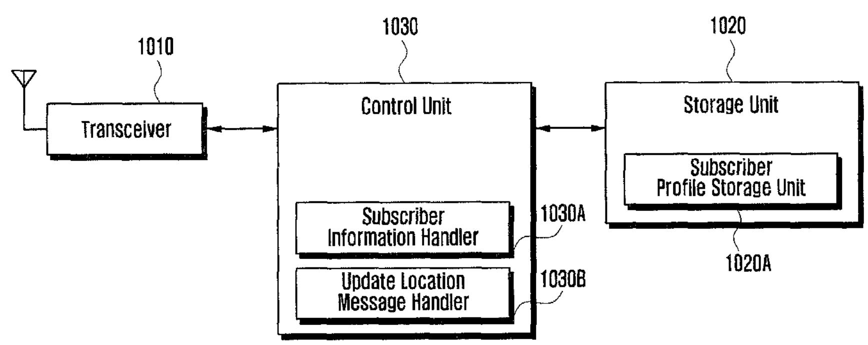
FIG. 10 is a block diagram illustrating a configuration of the HSS 150 according to an embodiment of the present invention.

FIG. 10 is a block diagram illustrating a configuration of the HSS 150 according to an embodiment of the present invention. As shown in FIG. 10, the HSS 150 of the present invention includes a transceiver 1010, a storage unit 1020, and a control unit 1030.

The transceiver 1010 is responsible for data communication of the HSS 150. The transceiver 1010 also receives control signal and data through wireless and wired channel and deliver the control signal and data to the control unit 1030 and transmits the control signal and data output by the control unit 1030 through the wireless or wired channel.

The storage unit 1020 stores the programs and data necessary for the operation of the HSS 150 and can be divided into a program region and a data region. According to an embodiment of the present invention, the storage unit 1020 is capable of including a subscriber profile storage region 1020A.

The subscriber profile storage region 1020A stores the profiles of the subscribers subscribed for the mobile communication service. The subscriber profile includes a UE identifier (e.g. IMSI) for identifying the subscriber and subscription information for data service, text service, etc. Particularly, the subscriber profile includes the CSG Subscription Data containing CSG ID of the subscriber, Validation, etc.

The control unit 1030 controls overall operations of the HSS 150 according to an embodiment of the present invention. Particularly in an embodiment of the present invention, the control unit 1030 is capable of including a subscriber information handler 1030A and an update location message handler 1030B.

The subscriber information handler 1030A checks whether the CSG operation indication bit value is configured in the update location request message received form the MME 140. If it is configured, the subscriber information handler 1030A checks the CSG ID information included in the update location request message and, if the checked CSG ID information is not included in its CSG subscription data information, adds the received CSG ID information to the CSG subscription data information. Otherwise, if the checked CSG ID information is included in its CSG subscription data information, the subscriber information handler 1030A deletes the corresponding CSG ID information from the CSG subscription data information.

The update location message handler 1030B generates the response message according to whether the subscriber information is handled successfully. In more detail, if the CSG ID is handled successfully, the update location message handler 1030*b* generates and sends the update location handling complete response message to the MME 140. In this case, the update location response message includes the updated CSG subscription data information.

If it is impossible to process the CSG ID information normally, the update location message handler 1030B generates and sends the update location failure response message to the MME 140.

Although exemplary embodiments of the present invention have been described in detail hereinabove with specific terminology, this is for the purpose of describing particular embodiments only and not intended to be limiting of the invention. While particular embodiments of the present invention have been illustrated and described, it would be obvious to those skilled in the art that various other changes and modifications can be made without departing from the spirit and scope of the invention.

For example, although the description is directed to the exemplary case of registering or deleting the CSG ID information, the present invention can be applied to the procedure for modifying the registered CSG ID information. In order to achieve this, it may possible to define a CSG Operation Type newly to discriminate among creation, deletion, and modification operations. Accordingly, when the tracking area update message is received, the MME or the HSS is capable of check the CSG operation type to determine the subsequent procedure.

In case that the CSG ID information is configured in the form of a list, it is possible to create or delete more than one CSG ID information simultaneously. When updating or configuring the lease time of the CSG ID in use or newly defined, the UE is capable of including the expiration date value to be configured with the CSG ID information in the tracking area update request message. When the CSG ID information is received, the network (MME, HSS) determines whether the information on the expiry date is included and, if so, updates the received expiry date value. In case that no expiry date information is included, if a value set for the corresponding CSG ID exists, the network uses the existing value and, if not, the default value.

As described above, according to the present invention, the subscriber is capable of managing, i.e. creating and deleting, CSG ID information at each node of the system by means of the UE 110.

What is claimed is:

1. A method of configuring subscriber information of a terminal in a mobile communication system including femto cells, the method comprising:

generating, at the terminal, information for configuring subscriber information;

transmitting, to a mobility management entity, a tracking area update request message including the information; and receiving a tracking area update accept message or a tracking area update reject message from the mobility management entity according to whether configuration of the subscriber information is processed successfully at a home subscriber server, wherein the subscriber information is a Closed Subscriber Group IDentifier (CSG ID), and wherein the information comprises at least one of a subscriber configuration field to indicate whether the tracking area update request message is transmitted for the purpose of subscriber information configuration and a subscriber information input field for containing the subscriber information.

2. A method of configuring subscriber information of a mobility management entity in a mobile communication system including femto cells, the method comprising:

transmitting, if a tracking area update request message including information for configuring subscriber information generated at a terminal is received from the terminal, an update location request message generated for configuring the subscriber information to a home subscriber server;

updating, if an update location success response message from the home subscriber server is received, the subscriber information based on the information; and transmitting a tracking area update accept message to the terminal, wherein the subscriber information is a Closed Subscriber Group IDentifier (CSG ID), and wherein transmitting the update location request message comprises designating a subscriber information configuration operation indication bit for subscriber information configuration and a subscriber data field for containing the subscriber information.

3. The method of claim 2, wherein transmitting the tracking area update accept message comprises including information indicating that subscription information is configured successfully in the tracking area update accept message.

4. The method of claim 2, further comprising:

receiving, if configuration of the subscriber information has failed at the home subscriber server, an update location failure response message from the home subscriber server; and transmitting a tracking area update reject message to the terminal.

5. The method of claim 4, wherein transmitting the tracking area update reject message comprises configuring a field indicating failure of configuring subscriber information in the tracking area update reject message.

6. The method of claim 2, wherein transmitting the tracking area update accept message comprises transmitting a Non-Access Stratum message including the subscriber information to a femto cell base station.

7. A method of configuring subscriber information of a home subscriber server in a mobile communication system including femto cells, the method comprising:

receiving an update location request message from a mobility management entity; and configuring the subscriber information according to whether the update location request message includes information for configuring subscriber information generated at a terminal and responding according to whether configuration of the subscriber information is processed successfully, wherein the subscriber information is a Closed Subscriber Group IDentifier (CSG ID), and wherein the update location request message is transmitted by the mobility management entity in response to reception of a tracking area update request message including the information.

8. The method of claim 7, wherein configuring the subscriber information comprises:

including, if subscriber information corresponding to the information is not included in a subscription data information of the corresponding subscriber, the subscriber information in the subscription data information; and deleting, if the subscriber information corresponding to the information is included in the subscription data information, the subscriber information from the subscription data information.

9. The method of claim 7, wherein configuring the subscriber information comprises:

transmitting, if the subscriber information is configured successfully, an update location success response message to the mobility management entity.

10. The method of claim 9, wherein transmitting the update location success response message comprises including updated subscriber data information in the update location success response message.

11. The method of claim 7, further comprising transmitting, if the configuration of the subscriber information has failed, an update location failure response message to the mobility management entity.

12. The method of claim 11, wherein transmitting the update location failure response message comprises including information indicating that the configuration of the subscriber information has failed in the update location failure response message.

13. A method of configuring subscriber information of a femto cell base station in a mobile communication system, the method comprising:

checking, if the Non-Access Stratum (NAS) message is received from a mobility management entity, the subscriber information in the NAS message;

updating, if the received subscriber information is not included in a subscriber information list, the subscriber information list by adding the received subscriber information; and deleting, if the received subscriber information is included in the subscriber information list, the subscriber information from the subscriber information list, wherein the subscriber information is a Closed Subscriber Group IDentifier (CSG ID), and wherein information for configuring the subscriber information is generated at a terminal and transmitted to the mobility management entity before the checking of the subscriber information in the NAS message.

14. A terminal for configuring subscriber information in a mobile communication system including femto cells, the terminal comprising:

a radio communication unit configured to transmit/receive messages for configuring the subscriber information; and a control unit configured to generate information for configuring subscriber information, to transmit, to a mobility management entity, a tracking area update request message including the information, and to receive a tracking area update accept message or a tracking area update reject message from the mobility management entity according to whether configuration of the subscriber information is processed successfully at a home subscriber server, wherein the subscriber information is a Closed Subscriber Group IDentifier (CSG ID), and wherein the information comprises at least one of a subscriber configuration field to indicate whether the tracking area update request message is transmitted for the purpose of subscriber information configuration and a subscriber information input field for containing the subscriber information.

15. A mobility management entity for configuring subscriber information in a mobile communication system including femto cells, the mobility management entity comprising:

a storage unit configured to store the subscriber information;

a radio communication unit configured to transmit/receive messages for configuring the subscriber information; and a control unit configured to transmit an update location request message generated for configuring the subscriber information to a home subscriber server if a tracking area update request message including information for configuring subscriber information generated at a terminal is received from the terminal, to update the subscriber information based on the information if an update location success response message from the home subscriber server is received, and to transmit a tracking area update accept message to the terminal, wherein the subscriber information is a Closed Subscriber Group IDentifier (CSG ID).

16. The mobility management entity of claim 15, wherein the control unit is configured to designate a subscriber information configuration operation indication bit for subscriber information configuration and a subscriber data field for containing the subscriber information, include information indicating that subscription information is configured successfully in the tracking area update accept message, receive an update location failure response message from the home subscriber server if the configuration of the subscriber information has failed at the home subscriber server, transmit a tracking area update reject message to the terminal, and configure a field indicating the failure of the configuration of the subscriber information in the tracking area update reject message.

17. The mobility management entity of claim 15, wherein the control unit is configured to transmit a Non-Access Stratum message including the subscriber information to a femto cell base station.

18. A home subscriber server for configuring subscriber information in a mobile communication system including femto cells, the home subscriber server comprising:

a storage unit configured to store the subscriber information;

a radio communication unit configured to transmit/receive messages for configuring the subscriber information; and a control unit configured to receive an update location request message from a mobility management entity, and to configure the subscriber information according to whether the update location request message includes information for configuring subscriber information generated at a terminal and responding according to whether configuration of the subscriber information is processed successfully, wherein the subscriber information is a Closed Subscriber Group IDentifier (CSG ID), and wherein the update location request message is transmitted by the mobility management entity in response to reception of a tracking area update request message including the information.

19. The home subscriber server of claim 18, wherein the control unit is configured to include the received subscriber information in the subscription data information if the subscriber information corresponding to the information is not included in a subscription data information of the corresponding subscriber, and delete the subscriber information from the subscription data information if the subscriber information corresponding to the information is included in the subscription data information.

20. The home subscriber server of claim 18, wherein the control unit is configured to include updated subscriber data information in an update location success response message, transmit the update location success response message to the mobility management entity if the subscriber information is configured successfully, include information indicating that the configuration of the subscriber information has failed in an update location failure response message, and transmit the update location failure response message to the mobility management entity if the configuration of the subscriber information has failed.

21. A femto cell base station for configuring subscriber information in a mobile communication system, the femto cell base station comprising:

a storage unit configured to store the subscriber information;

a radio communication unit configured to transmit/receive messages for configuring the subscriber information; and a control unit configured to check the subscriber information in a Non-Access Stratum (NAS) message if the NAS message is received from a mobility management entity, to update a subscriber information list by adding the received subscriber information if the received subscriber information is not included in the subscriber information list, and to delete the subscriber information from the subscriber information list if the received subscriber information is included in the subscriber information list, wherein the subscriber information is a Closed Subscriber Group IDentifier (CSG ID), and wherein information for configuring the subscriber information is generated at a terminal and transmitted to the mobility management entity before the checking of the subscriber information in the NAS message.

* * * * *